(12) United States Patent
Matsuo et al.

(10) Patent No.: US 10,222,521 B2
(45) Date of Patent: *Mar. 5, 2019

(54) SHEET-FORM TRANSPARENT MOLDING, TRANSPARENT SCREEN COMPRISING SAME, AND IMAGE PROJECTION DEVICE COMPRISING SAME

(71) Applicant: JXTG NIPPON OIL & ENERGY CORPORATION, Tokyo (JP)

(72) Inventors: Akira Matsuo, Tokyo-to (JP); Suzushi Nishimura, Tokyo-to (JP); Satoru Inoue, Tokyo-to (JP); Kousuke Yamaki, Tokyo-to (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/003,678

(22) Filed: Jun. 8, 2018

(65) Prior Publication Data

US 2018/0292582 A1  Oct. 11, 2018

Related U.S. Application Data

(62) Division of application No. 15/538,059, filed as application No. PCT/JP2015/084206 on Dec. 4, 2015, now Pat. No. 10,018,754.

(30) Foreign Application Priority Data

Dec. 22, 2014 (JP) ................................. 2014-259300
Jun. 11, 2015 (JP) ................................. 2015-118666

(51) Int. Cl.
*G02B 5/02* (2006.01)
*B32B 7/02* (2019.01)
(Continued)

(52) U.S. Cl.
CPC .............. *G02B 5/0242* (2013.01); *B32B 7/02* (2013.01); *B32B 27/20* (2013.01); *G02B 5/02* (2013.01);
(Continued)

(58) Field of Classification Search
CPC ..... G02B 5/0242; G03B 21/62; G03B 21/625
(Continued)

(56) References Cited

U.S. PATENT DOCUMENTS 4,674,836 A  6/1987 Yata
5,914,811 A  6/1999 Chen
(Continued)

FOREIGN PATENT DOCUMENTS

JP  3-119334  5/1991
JP  6-118509  4/1994
(Continued)

OTHER PUBLICATIONS

International Search Report dated Mar. 8, 2016 in corresponding International Application No. PCT/JP2015/084206.
(Continued)

*Primary Examiner* — Christopher E Mahoney
(74) *Attorney, Agent, or Firm* — Wenderoth, Lind & Ponack, L.L.P.

(57) ABSTRACT

Provided is a sheet-form transparent molding for use for a transparent screen, satisfying both visibilities of a projected light and a transmitted light by anisotropically scattering and reflecting the projected light emitted from a light source. A sheet-form transparent molding according to the present invention comprises a transparent light scattering layer comprising a resin and bright flake-form microparticles.

12 Claims, 1 Drawing Sheet

(51) Int. Cl.
*B32B 27/20* (2006.01)
*G03B 21/60* (2014.01)
*G03B 21/62* (2014.01)
*H04N 5/74* (2006.01)
*G03B 21/625* (2014.01)
*B32B 9/04* (2006.01)

(52) U.S. Cl.
CPC ............ *G03B 21/60* (2013.01); *G03B 21/62* (2013.01); *G03B 21/625* (2013.01); *H04N 5/74* (2013.01); *H04N 5/7408* (2013.01); *B32B 9/048* (2013.01)

(58) Field of Classification Search
USPC ........................................................ 359/453
See application file for complete search history.

(56) References Cited

U.S. PATENT DOCUMENTS

| 6,144,491 | A  | 11/2000 | Orikasa |
| 6,958,860 | B2 | 10/2005 | Dontula |
| 7,855,833 | B2 | 12/2010 | Harada |
| 8,485,666 | B2 | 7/2013 | Cho |
| 2017/0059982 | A1 | 3/2017 | Watanabe |
| 2017/0205701 | A1 | 7/2017 | Ide |

FOREIGN PATENT DOCUMENTS

| JP | 9-304837 | 11/1997 |
| JP | 10-186521 | 7/1998 |
| JP | 10-213851 | 8/1998 |
| JP | 11-44915 | 2/1999 |
| JP | 2000-256041 | 9/2000 |
| JP | 2002-258011 | 9/2002 |
| JP | 2004-54132 | 2/2004 |
| JP | 2005-186275 | 7/2005 |
| JP | 2007-230208 | 9/2007 |
| JP | 2007-272197 | 10/2007 |
| JP | 2008-158483 | 7/2008 |
| JP | 2010-79197 | 4/2010 |

OTHER PUBLICATIONS

Notification of Reasons for Refusal dated Jun. 17, 2016 in corresponding Japanese Application No. 2016-521801 (with machine translation).

Notification of Reasons for Refusal dated Sep. 27, 2016 in corresponding Japanese Application No. 2016-521801 (with machine translation).

International Preliminary Report on Patentability dated Jul. 6, 2017 in corresponding International Application No. PCT/JP2015/084206.

SHEET-FORM TRANSPARENT MOLDING, TRANSPARENT SCREEN COMPRISING SAME, AND IMAGE PROJECTION DEVICE COMPRISING SAME

TECHNICAL FIELD

The present invention relates to a sheet-form transparent molding, capable of satisfying both visibilities of projected light and transmitted light by anisotropically scattering and reflecting the projected light, a transparent screen comprising the same, and an image projection device comprising the same.

BACKGROUND ART

Conventionally, a combination of a Fresnel lens sheet and a lenticular lens sheet has been used for a projector screen. In recent years, a demand for displaying merchandise information, advertisement, or the like by projection on a shop window of a department store or the like, a transparent partition of an event venue, or the like while maintaining the transparency thereof is growing. It is said that, in the future, a demand for a highly transparent projection type image display screen which is used for a head-up display, a wearable display, or the like will be further increasing.

However, since a conventional projector screen has a low transparency, there is a technical problem that such projector screen cannot be applied to a transparent partition, or the like. Therefore, various screens are proposed that are capable of attaining a high transparency. For example, there is proposed a reflection type screen characterized in that 7 parts by weight of an aluminum flake and 25 parts by weight of pearl pigment flakes, which are based on mica coated with titanium dioxide, are mixed and used as a filler for an ink which is printed or coated on a plastic film or a sheet to form a light reflection layer (see Patent Document 1). A reflection type screen for a projector is proposed, characterized in that an optical diffusion layer is provided on the substrate, comprising from 10 to 80 by weight of a flake-form aluminum paste of a non-refilling type as a light reflecting agent, based on 100 parts by weight of a binder resin, and additionally 50% by weight or more of a light diffusion agent based on the light diffusion agent (see Patent Document 2). Further, a reflection type screen is proposed, in which an optical diffusion layer is laminated on a light reflection substrate, formed by a continuous layer composed of a transparent resin and a dispersion layer composed of anisotropic transparent particles (see Patent Document 3).

RELATED ART DOCUMENTS

Patent Documents

Patent Document 1 Japanese Unexamined Patent Application Publication No. 1991-119334
Patent Document 2 Japanese Unexamined Patent Application Publication No. 1998-186521
Patent Document 3 Japanese Unexamined Patent Application Publication No. 2004-54132

SUMMARY OF THE INVENTION

Problems to be Solved by the Invention

However, the present inventors found the following technical problems in Patent Documents 1 to 3. The reflection type screen described in Patent Document 1 have a technical problem that an image cannot be clearly visualized due to glare of a coating film since the flake particles are coated on a substrate surface in a high concentration, and that a perspective view is impossible since a white-colored vinyl chloride film is used for the substrate. The reflection type screen described in Patent Document 2 comprises a high-concentration, 10 to 80 by weight, of the flake-form aluminum paste as the light reflecting agent; therefore have a technical problem that a perspective view is impossible in the obtained film. The reflective screen described in Patent Document 3 has a technical problem that, since the anisotropic transparent particles dispersed in the dispersion layer are non-metallic particles of mica, talc, and montmorillonite, and especially, talc and montmorillonite are clay-based particles, it has a low regular reflectance and cannot be suitably used as a reflection type transparent screen.

Means for Solving the Problems

The present invention has been made in view of the above-described technical problems, and an object of the present invention is to provide a sheet-form transparent molding having excellent visibility of a projected light due to anisotropic scattering and reflecting of the projected light, and further having a wide viewing angle and excellent visibility of a transmitted light. An object of the present invention is also to provide a transparent screen comprising the sheet-form transparent molding and an image projection device comprising the sheet-form transparent molding or the transparent screen and a projection device. A transparent sheet mentioned here may be a transmission or a reflection type screen. A transmission type screen is a screen that an image can be visualized by setting a projection device on the opposite side of a viewer against the screen as shown in FIG. 2, and a reflection type screen is a screen that an image can be visualized by setting a projection device on the viewer side (the same side as the viewer against the screen) as shown in FIG. 2.

In order to solve the above described technical problems, the present inventors intensively studied to find that the above described technical problems can be solved by dispersing bright flake-form microparticles in a resin and forming a transparent light scattering layer and as a result, a sheet-form transparent molding can be obtained which can be suitably used for a transparent screen. The present invention has been completed based on such findings.

That is, according to one aspect of the present invention, there is provided a sheet-form transparent molding comprising a transparent light scattering layer comprising a resin and bright flake-form microparticles.

According to one aspect of the present invention, an average diameter of primary particles of the bright flake-form microparticles is preferably from 0.01 to 100 μm.

According to one aspect of the present invention, regular reflectance of the bright flake-form microparticles is preferably 12% or more.

According to one aspect of the present invention, an average aspect ratio of the bright flake-form microparticles is preferably from 3 to 800.

According to one aspect of the present invention, the bright flake-form microparticles are preferably metallic particles selected from the group consisting of aluminum, silver, copper, platinum, gold, titanium, nickel, tin, tin-cobalt alloy, indium, chromium, titanium oxide, aluminum oxide, and zinc sulfide, a bright material of glass coated with metallic oxide or metal, or a bright material of natural or synthetic mica coated with metal or metallic oxide.

According to one aspect of the present invention, the resin is preferably at least one selected from the group consisting of an acrylic resin, a polyester resin, a polyolefin resin, a vinyl resin, a polycarbonate resin, and a polystyrene resin.

According to one aspect of the present invention, the content of the bright flake-form microparticles is preferably from 0.0001 to 5.0% by mass based on the resin.

According to one aspect of the present invention, the transparent light scattering layer preferably further comprises substantially spherical microparticles.

According to one aspect of the present invention, the difference between a refractive index $n_2$ of the substantially spherical microparticles and a refractive index $n_1$ of the resin preferably satisfies the following formula (1):

$$|n_1-n_2|\geq 0.1 \tag{1}.$$

According to one aspect of the present invention, the substantially spherical microparticles are preferably at least one selected from the group consisting of zirconium oxide, titanium oxide, zinc oxide, cerium oxide, barium titanate, strontium titanate, magnesium oxide, calcium carbonate, barium sulfate, diamond, a cross-linked acrylic resin, a cross-linked styrene resin, and silica.

According to one aspect of the present invention, a median diameter of primary particles of the substantially spherical microparticles is preferably from 0.1 to 500 nm.

According to one aspect of the present invention, the content of the substantially spherical microparticles is preferably from 0.0001 to 2.0% by mass based on the resin.

According to one aspect of the present invention, the sheet-form transparent molding preferably has a total light transmittance of 70% or higher.

According to one aspect of the present invention, the sheet-form transparent molding preferably has a diffusion transmittance from 1.5% to 50% or less.

According to one aspect of the present invention, the sheet-form transparent molding preferably has an image clarity of 70% or higher.

According to one aspect of the present invention, the sheet-form transparent molding preferably further comprises on one side a transparent reflection layer having a refractive index $n_3$, higher than the refractive index $n_1$.

According to one aspect of the present invention, the refractive index $n_3$ of the transparent reflection layer is preferably 1.8 or higher.

According to one aspect of the present invention, the transparent reflection layer preferably comprises at least one selected from the group consisting of titanium oxide, niobium oxide, cerium oxide, zirconium oxide, indium tin oxide, zinc oxide, tantalum oxide, zinc sulfide, and tin oxide.

According to one aspect of the present invention, an optical film thickness represented by the product of the refractive index $n_3$ and film thickness d is preferably from 20 to 400 nm.

According to one aspect of the present invention, the sheet-form transparent molding is preferably for a transmission type transparent screen.

According to one aspect of the present invention, the sheet-form transparent molding is preferably for a reflection type transparent screen.

In another aspect of the present invention, there is provided a transmission type transparent screen, comprising the above-described sheet-form transparent molding.

In another aspect of the present invention, there is provided a reflection type transparent screen, comprising the above-described sheet-form transparent molding.

In another aspect of the present invention, there is provided a laminated body, comprising the above described sheet-form transparent molding, transmission type transparent screen, or a reflection type transparent screen.

In another aspect of the present invention, there is provided a member for a vehicle, comprising the above described sheet-form transparent molding, transmission type transparent screen, or a reflection type transparent screen.

In another aspect of the present invention, there is provided a member for a house, comprising the above described sheet-form transparent molding, transmission type transparent screen, or a reflection type transparent screen.

In another aspect of the present invention, there is provided an image projection device, comprising the above described sheet-form transparent molding or transmission type transparent screen, and a projection device.

In another aspect of the present invention, there is to provided an image projection device, comprising the above described sheet-form transparent molding or reflection type transparent screen, and a projection device.

Effects of the Invention

When a sheet-form transparent molding of the present invention is used as a transparent screen, clear image can be projected on the transparent screen by scattering and reflecting a projected light anisotropically without compromising transparency and in addition, the viewing angle is excellent. That is, the sheet-form transparent molding of the present invention can satisfy both visibilities of a projected light and a transmitted light, and can be used suitably as a transmission type transparent screen as well as a reflection type transparent screen. Further, the sheet-form transparent molding of the present invention can be suitably used for a member for a vehicle or a house. The sheet-form transparent molding of the present invention can be suitably used as a light guide plate used in an image display device, an image projection device, a light source for a scanner, or the like.

MODE FOR CARRYING OUT THE INVENTION

<Sheet-Form Transparent Molding>

A sheet-form transparent molding according to the present invention comprises a transparent light scattering layer. The sheet-form transparent molding according to the present invention enables a perspective view and can be suitably used as a transparent screen. The sheet-form transparent molding according to the present invention has excellent visibility of a projected light since the projected light is anisotropically scattered and reflected, has a wide viewing angle, and further has high transparency and excellent visibility of a transmitted light. Such a sheet-form transparent molding can be used suitably as a reflection type screen used for a head-up display, a wearable display, or the like. In the present invention, the term "transparent" means transparent in the degree that a transmission visibility depending on the applications is attained and also includes being "translucent".

Figure 1:
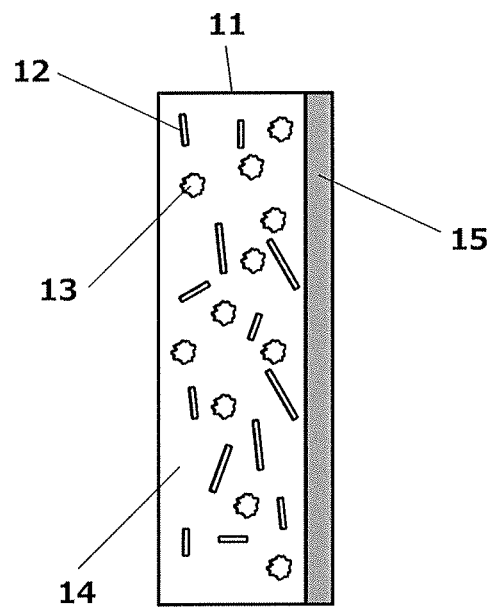
FIG. 1 is a cross-sectional schematic diagram in the thickness direction of one embodiment of a sheet-form transparent molding according to the present invention.

FIG. 1 is a cross-sectional schematic diagram in the thickness direction, illustrating one embodiment of a sheet-form transparent molding according to the present invention. The transparent sheet-form molding consists of a transparent light scattering layer 11 consisting of bright flake-form microparticles 12 dispersed in a resin 14. Such a light scattering layer 11 may comprise substantially spherical microparticles 13. A two-ply constitution comprising the light scattering layer 11 and a transparent reflection layer 15, or a layered body of a multi-ply constitution further comprising other layers such as a protection layer, a backing layer, an adhesive layer, a reflection protection layer, or the like, may be possible.

The haze value of the sheet-form transparent molding is preferably 50% or less, more preferably from 1% to 40% or less, more preferably from 1.3% to 30% or less, and still more preferably from 1.5% to 20% or less. The total light transmittance of the sheet-form transparent molding is preferably 70% or higher, more preferably 75% or higher, still preferably 80% or higher, and still more preferably 85% or higher. The diffusion transmittance of the sheet-form transparent molding is preferably from 1.5% to 50% or less, more preferably from 1.7% to 45% or less, more preferably from 1.9% to 40% or less, and still more preferably from 2.0% to 38% or less. The transparency will be high and the transmission visibility will be more improved if the haze value and the total light transmittance are within the above-described ranges, and when the diffusion transmittance is within the above-described range, the entering light will be efficiently diffused and the viewing angle can be improved; resulting in an excellent performance as a screen. In the present invention, the haze value, the total light transmittance, and the diffusion transmittance of the sheet-form transparent molding can be measured by using a turbidimeter (Part No.: NDH-5000; manufactured by NIPPON DENSHOKU INDUSTRIES CO., LTD.) in accordance with JIS-K-7361 and JIS-K-7136.

The image clarity of the laminated body is preferably 70% or higher, more preferably 75% or higher, further preferably 80% or higher, still more preferably 85% or higher, and particularly preferably 90% or higher. An image transmitted through a transparent screen to be seen will be remarkably clear when the image clarity of the laminated body is within the above-described range. In the present invention, the image clarity is a value of definition (%) when measured with an optical comb having a width of 0.125 mm in accordance with JIS K7374.

The reflected frontal luminous intensity of the sheet-form transparent molding is preferably from 3 to 60 or less, more preferably from 4 to 50 or less, and still preferably from 4.5 to 40 or less. The transmitted frontal luminous intensity of the sheet-form transparent molding is preferably 1.5 or higher, more preferably 2.0 or higher, and still preferably from 3.0 to 50 or less. When the reflected and transmitted frontal luminous intensity of the sheet-form transparent molding are within the above-described ranges, the brightness of the reflection light will be high, resulting in an excellent performance as a reflection type screen. In the present invention, the progression rates of the reflected and transmitted frontal luminous intensities are values measured in such way as follows.

(Reflected Frontal Luminous Intensity)

The reflected frontal luminous intensity is measured by using a goniophotometer (Part No.: GC5000L; manufactured by NIPPON DENSHOKU INDUSTRIES CO., LTD.). An entering angle of a light source is set to 45 degrees, and a reflected light intensity in the direction of 0 degree when a standard white-colored plate with whiteness degree of 95.77 was placed on the measuring stage is 100. When a sample is measured, the entering angle of the light source is set to 15 degrees and the intensity of the reflected light in the direction of 0 degree is measured.

(Transmitted Frontal Luminous Intensity)

The transmitted frontal luminous intensity is measured by using a goniophotometer (Part No.: GC5000L; manufactured by NIPPON DENSHOKU INDUSTRIES CO., LTD.). An entering angle of a light source is set to 0 degree, and a transmitted light intensity in the direction of 0 degree with nothing placed on the measuring stage is 100. When a sample is measured, the entering angle of the light source is set to 15 degrees and the intensity of the transmitted light in the direction of 0 degree is measured.

The thickness of the sheet-form transparent molding is not particularly limited; however, in view of purposes, productivity, handling, and portability, it is preferably from 0.1 μm to 20 mm, more preferably from 0.2 μm to 15 mm, and still preferably from 1 μm to 10 mm. In the present invention, a "sheet-form transparent molding" includes moldings of various thickness such as what is called a film, a sheet, a coated film body formed by coating on a substrate, a plate (a plate-form molding), or the like.

(Transparent Light scattering layer)

The transparent light scattering layer comprises a resin and bright flake-form microparticles. The use of bright flake-form microparticles as below will anisotropically scatter and reflect the light in the transparent light scattering layer, and thus the viewing angle can be improved.

The thickness of the transparent light scattering layer is not particularly limited; however, in view of purposes, productivity, handling, and portability, it is preferably from 0.1 μm to 20 mm, more preferably from 0.2 μm to 15 mm, and still preferably from 1 μm to 10 mm. The transparent light scattering layer may be the sheet-form transparent molding or may be a coated film formed on a substrate comprising glass, a resin, or the like. The transparent light scattering layer may be of a single-ply constitution or a multi-ply constitution, formed by layering two or more layers with coating or by sticking together two or more sheet-form transparent moldings with an adhesive, or the like.

(Resin)

As a resin forming the transparent light scattering layer, a highly transparent resin is preferably used in order to obtain a sheet-form transparent molding of a high transparence. For a highly transparent resin, a thermoplastic resin such as an acrylic resin, an acrylic urethane resin, a polyester acrylate resin, a polyurethane acrylate resin, an epoxy acrylate resin, a polyester resin, a polyolefin resin, a urethane resin, an epoxy resin, a polycarbonate resin, a cellulose resin, an acetal resin, a vinyl resin, a polystyrene resin, a polyamide resin, a polyimide resin, a melamine resin, a phenol resin, a silicone resin, a polyarylate resin, a polyvinyl alcohol resin, a polyvinyl chloride resin, a poly sulfone resin, and a fluorocarbon resin; a thermoset resin; an ionizing radiation-curable resin; or the like can be used. Among these, a thermoplastic resin is preferably used in view of formability of the sheet-form transparent molding but without specific limitation. As thermoplastic resins, preferably, an acrylic resin, a polyester resin, a polyolefin resin, a vinyl resin, a polycarbonate resin, and a polystyrene resin are used, and more preferably, a polymethyl methacrylate resin, a polyethylene terephthalate resin, a polyethylene naphthalate resin, a polypropylene resin, a cycloolefin polymer resin, a cellulose acetate propionate resin, a polyvinyl butyral resin, a polycarbonate resin, and a polystyrene resin are used. These resins may be used singly, or in combination of two or more kinds thereof. The ionizing radiation-curable resin includes an acrylic resin, a urethane resin, an acrylic urethane resin, an epoxy resin, and a silicone resin. Among these, those having an acrylate functional group, for example, those containing a relatively high amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri(meth)acrylate, hexane diol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth)acrylate of a polyfunctional compound such as a polyalcohol and a reactivity diluent having a relatively low molecular weight are preferable. The ionizing radiation-curable resin may be obtained by mixing a thermoplastic resin and a solvent. The thermoset resin includes a phenol resin, an epoxy resin, a silicone resin, a melamine resin, a urethane resin, and a urea resin. Among these, an epoxy resin and a silicone resin are preferable.

(Bright Flake-Form Microparticles)

As bright flake-form microparticles, a bright material processable to a flake form can be suitably used. The regular reflectance of the bright flake-form microparticles is preferably 12.0% or higher, more preferably from 15.0% to 100% or less, and still preferably from 20.0% to 95.0% or less. In the present invention, the regular reflectance of the bright flake-form microparticles is measured in such way as follows.

(Regular Reflectance)

The regular reflectance is measured by using a spectrophotometer (Part No.: CM-3500d; manufactured by KONICA MINOLTA INC.). A powder material dispersed in an appropriate solvent (water or methyl ethyl ketone) is coated on a glass slide such that the film thickness will be 0.5 mm or more and dried. Using this obtained glass plate with the coated film, the regular reflectance of the film-coated part from the glass surface is measured.

As the bright flake-form microparticles, for example, metallic microparticles such as aluminum, silver, platinum, gold, copper, titanium, nickel, tin, tin-cobalt alloy, indium, and chromium, or metallic microparticles consisting of titanium oxide, aluminum oxide, and zinc sulfide, a bright material of glass coated with metal or metal oxide, or a bright material of natural or synthetic mica coated with metal or metal oxide can be used, depending on the kind of resin to be dispersed in.

The average diameter of the primary particles of the bright flake-form microparticles is preferably from 0.01 to 100 μm, more preferably from 0.05 to 80 μm, still preferably from 0.1 to 50 μm, and still more preferably from 0.5 to 30 μm. The average aspect ratio (=average diameter/average thickness of the bright flake-form microparticles) of the bright flake-form microparticles is preferably from 3 to 800, more preferably from 4 to 700, still preferably from 5 to 600, still more preferably from 10 to 500. When the sheet-form transparent molding is used as the transparent screen with the average diameter and the average aspect ratio of the bright flake-form microparticles being within the above-described ranges, a clear image can be projected since a sufficient scattering effect of the transmitted light is obtained without compromising the transmission visibility. In the present invention, the average diameter of the bright flake-form microparticles is measured using a laser diffraction particle size distribution measuring device (Part No.: SALD-2300; manufactured by Shimadzu Corporation). The average aspect ratio was calculated from an SEM (Trade Name: SU-1500; manufactured by Hitachi High Technologies Corporation) image.

As for the bright flake-form microparticles, those commercially available may be used, and for example, aluminum powder manufactured by Daiwa Kinzoku Kogyo Co., Ltd., METASHINE, glass coated with metal, manufactured by MATSUO SANGYO CO., LTD., or the like can be suitably used.

The content of the bright flake-form microparticles in the transparent light scattering layer can be appropriately adjusted, depending on the regular reflectance of the bright flake-form microparticles, and preferably is from 0.0001 to 5.0% by mass, preferably from 0.0005 to 3.0% by mass, more preferably from 0.001 to 1.0% by mass, based on the resin. The visibilities of the projected light and the transmitted light can be improved by dispersing the bright flake-form microparticles in the resin in a low concentration as the range described above and forming the transparent light scattering layer to anisotropically scatter and reflect the transmitted light emitted from a light source.

(Substantially Spherical Microparticles)

Substantially spherical microparticles may comprise true spherical particles or spherical particles with unevenness or protrusion. A refractive index $n_1$ of the resin and a refractive index of $n_2$ of the substantially spherical microparticles preferably satisfy the following formula (1):

$$|n_2-n_1| \geq 0.1 \qquad (1),$$

more preferably the following formula (2):

$$|n_2-n_1| 0.15 \qquad (2),$$

and still preferably the following formula (3):

$$3.0 \geq |n_2-n_1| \geq 0.2 \qquad (3).$$

When the refractive indices of the resin and the substantially spherical microparticles forming the transparent light scattering layer satisfy the above described formulae, the light is anisotropically scattered in the transparent light scattering layer, and thus the viewing angle can be improved. The use of the substantially spherical microparticles will scatter the light in all directions, and thus the brightness can be improved.

As for the substantially spherical microparticles having a high refractive index, inorganic microparticles can be used with a refractive index $n_2$ preferably of 1.80 to 3.55, more preferably of 1.9 to 3.3, and still preferably of 2.0 to 3.0. As for the inorganic microparticles, inorganic materials such as metallic particles by atomizing metal oxide or metal salt, diamond (n=2.42), or the like can be used. Examples of the metal oxide include zirconium oxide (n=2.40), oxidation zinc (n=2.40), titanium oxide (n=2.72), and cerium oxide (n=2.20), etc. Examples of the metal salts include barium titanate (n=2.40) and strontium titanate (n=2.37), etc. As for the inorganic substantially spherical microparticles having a low refractive index, the refractive index $n_2$ is preferably from 1.35 to 1.80, more preferably from 1.4 to 1.75, and still preferably from 1.45 to 1.7, and included therein are particles by atomizing silica (silicon oxide; n=1.45), magnesium oxide (n=1.74), calcium carbonate (n=1.58), barium sulfate (n=1.64), or the like. Examples of the organic substantially spherical microparticles having a low refractive index include an acrylic resin and a polystyrene resin. One of these substantially spherical microparticles can be used alone or 2 of these in a combination.

Primary particles of the substantially spherical microparticles have a median diameter, preferably of 0.1 to 500 nm, more preferably of 0.2 to 300 nm, and still preferably of 0.5 to 200 nm. When the transparent sheet is used with the median diameter of the primary particles of the substantially spherical microparticles being within the above range, a clear image can be projected on the transparent screen since a sufficient diffusion effect of the projected light is obtained without compromising the transmission visibility. In the present invention, the median diameter ($D_{50}$) of the primary particles of the substantially spherical inorganic microparticles can be determined from a particle size distribution measured using a particle size distribution measurement apparatus (Trade name: DLS-8000; manufactured by Otsuka Electronics Co., Ltd.) by a dynamic light scattering method.

The content of the substantially spherical microparticles can be appropriately adjusted, depending on the thickness of the transparent light scattering layer or the refractive index of the microparticles. The content of the microparticles in the transparent light scattering layer is preferably from 0.0001 to 2.0% by mass, more preferably from 0.001 to 1.0% by mass, still preferably from 0.005 to 0.5% by mass, still more preferably from 0.01 to 1.0% by mass, based on the resin. When the content of the substantially spherical microparticles in the transparent light scattering layer is within the above range, the visibility of the projected light and the transmitted light can be both satisfied by sufficiently diffusing the projected light anisotropically, emitted from the projection device, while ensuring transparency of the transparent light scattering layer.

(Transparent Reflection layer)

The transparent reflection layer is a layer to anisotropically scatter and diffuse the projected light emitted from a light source, and the sheet-form transparent molding comprising the transparent reflection layer can be suitably used as a transparent reflection type transparent screen. The visibility of the transmitted light is excellent since the transparent reflection layer allows a perspective view. The transparent reflection layer has a refractive index $n_3$, larger than the refractive index $n_1$ of the resin in the transparent light scattering layer. The refractive index $n_3$ of the transparent reflection layer is preferably 1.8 or higher, more preferably from 1.8 to 3.0 or less, and still preferably from 1.8 to 2.6 or less. The projected light emitted from a light source can be effectively scattered by forming the transparent reflection layer with a material having the refractive index $n_3$, larger than the refractive index $n_1$ of the resin in the transparent light scattering layer. The thickness of the transparent reflection layer is preferably from 5 to 130 nm, more preferably from 10 to 100 nm, and still preferably from 15 to 90 nm. A reflection type transparent screen having a high transparency can be provided when the thickness of the transparent reflection layer is within the above-described range.

The optical film thickness, represented by the product of the refractive index $n_3$ and film thickness d, of the transparent reflection layer is preferably from 20 to 400 nm, more preferably from 50 to 300 nm, and still preferably from 90 to 250 nm. When the optical film thickness of the transparent reflection layer is within the above-described numerical range, an image can be clearly visualized and result in excellent color reproducibility without color change of the reflected image.

The transparent reflection layer is preferably formed by using at least one material selected from the group consisting of titanium oxide, niobium oxide, cerium oxide, zirconium oxide, indium tin oxide, zinc oxide, tantalum oxide, zinc sulfide, and tin oxide. The use of such materials will achieve the refractive index $n_3$ as described above and allows efficient reflection of the projected light emitted from a light source.

A method to form the transparent reflection layer is not particularly limited and can be performed by a conventionally known method. For example, the transparent reflection layer can be formed by deposition, sputtering, or coating. The transparent reflection layer may be directly formed on the transparent light scattering layer, or formed on a backing layer consisted of a resin or glass and then stuck to the light scattering layer with an adhesive, or the like.

(Backing Layer)

A backing layer is a layer for supporting the sheet-form transparent molding, which can improve the strength of the sheet-form transparent molding. The backing layer is preferably formed by using a highly transparent resin or glass, which does not compromise the transmission visibility or the desired optical property of the sheet-form transparent molding. For such a resin, a highly transparent resin similar to the transparent light scattering layer described above can be used. That means, an acrylic resin, an acrylic urethane resin, a polyester acrylate resin, a polyurethane acrylate resin, an epoxy acrylate resin, a polyester resin, a polyolefin resin, a urethane resin, an epoxy resin, a polycarbonate resin, a cellulose resin, an acetal resin, a vinyl resin, a polystyrene resin, a polyamide resin, a polyimide resin, a melamine resin, a phenol resin, a silicone resin, a polyarylate resin, a polyvinyl alcohol resin, a polyvinyl chloride resin, a polysulfone resin, and a fluorocarbon resin; a thermoset resin; an ionizing radiation-curable resin; or the like can be suitably used. Also, a laminated body or a sheet formed by layering two or more resins described above may be used. The thickness of the backing layer can be appropriately changed depending on the pupose/material so that the strength thereof is suitable. For example, the thickness may be in the range of from 10 to 1 mm (1000 µm), or a thick board of 1 mm or more may be possible.

(Protection Layer)

A protection layer is layered on both or either of the front side (the viewer side) and the back side of the sheet-form transparent molding, and is a layer for imparting a function such as light resistance, scratch resistance, substrate adhesiveness, and stain resistance. The protection layer is preferably formed by using a resin which does not compromise the transmission visibility or the desired optical property of the sheet-form transparent molding.

Materials for such protection layer include, for example, polyester resins such as a polyethylene terephthalate and a polyethylene naphthalate; cellulosic resins such as a diacetylcellulose and a triacetylcellulose; acryl resins such as a a polymethyl methacrylate; styrene resins such as a polystyrene and an acrylonitrile-styrene copolymer (an AS resin); a polycarbonate resin; or the like. Examples of the resins that forms the protection layer include: polyolefin resins such as a polyethylene, a polypropylene, and an ethylene-propylene copolymer; a cyclo olefin resin or an olefin resin having a norbornene structure; a vinyl chloride resin; amide resins such as nylon and an aromatic polyamide; an imide resin; a sulfone resin; a polyether sulfone resin; a polyether ether ketone resin: a polyphenylene sulfide resin; a vinyl alcohol resin; a vinylidene chloride resin; a vinyl butyral resin; an arylate resin; a polyoxymethylene resin; an epoxy resin; or the blends of such resins. Others include: ionizing radiation-curable resin such as resins of an acrylic or a urethane, an acrylic urethane or an epoxy, or a silicone; a mixture of an ionizing radiation-curable resin with a thermoplastic resin and a solvent; a thermoset resin.

For a film forming component of the ionizing radiation-curable resin composition, preferably, those having an acrylate functional group, for example, those containing a relatively large amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri(meth)acrylate, hexane diol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth)acrylate of a polyfunctional compound such as a polyalcohol and a reactivity diluent having a relatively low molecular weight can be used.

In order to make the above-described ionizing radiation-curable resin composition an ultraviolet light curable resin composition, acetophenones, benzophenons, Michler's benzoyl benzoates, α-amidoxime esters, tetramethyl thiuram monosulfides, and thioxanthones as photopolymerization initiators, and n-butyl amine, triethylamine, and poly-n-butylphosphine as photosensitizers may be added thereto to be used. In particular, in the present invention, a urethane acrylate as an oligomer and a dipentaerythritol hexa(meth)acrylate or the like as a monomer are preferably mixed.

An ionizing radiation-curable resin composition can be cured by irradiation of an electron beam or an ultraviolet light using a normal curing method as a curing method. For example, in the case of electron beam curing, an electron beam having an energy of 50 to 1000 KeV, and preferably 100 to 300 KeV released from a variety of electron beam accelerators such as Cockcroft-Walton-type, Van de Graaff-type, resonance transformer-type, insulating core transformer-type, linear-type, Dynamitron-type, and high-frequency-type is used, and in the case of ultraviolet light curing, an ultraviolet light or the like emitted from a light beam such as an ultra-high pressure mercury lamp, a high pressure mercury lamp, a low pressure mercury lamp, a carbon arc, a xenon arc, and a metal halide lamp can be used.

A protection layer can be formed by applying a coating of the above-described ionizing radiation (ultraviolet light)-curable resin composition by a method such as spin coating, die coating, dip coating, bar coating, flow coating, roll coating, or gravure coating, on both or either of the front side (viewer side) and the back side of the sheet-form transparent molding for the reflection type screen as described above, and by curing the coating by the above-described means. To the surface of the protection layer, a microstructure such as a concavoconvex structure, a prism structure, or a microlens structure can also be provided depending on the purposes.

(Adhesive Layer)

An adhesive layer is a layer for sticking the sheet-form transparent molding to a support. The adhesive layer is preferably formed by using an adhesive composition which does not compromise the transmission visibility or the desired optical property of the sheet-form transparent molding. Examples of the adhesive composition include a natural rubber, a synthetic rubber, an acryl resin, a polyvinyl ether resin, a urethane resin, and a silicone resin. Specific examples of the synthetic rubber include a styrene-butadiene rubber, an acrylonitrile-butadiene rubber, a polyisobutylene rubber, an isobutylene-isoprene rubber, a styrene-isoprene block copolymer, a styrene-butadiene block copolymer, and a styrene-ethylene-butylene block copolymer. Specific examples of the silicone resin include a dimethyl polysiloxane. These adhesives can be used singly or in combination of two or more kinds thereof. Among these, an acrylic adhesive is preferable.

An acrylic resin adhesive includes at least an alkyl (meth)acrylate monomer and is formed by polymerization. Copolymerization of an alkyl (meth)acrylate monomer having an alkyl group having the number of carbon atoms of 1 to about 18 and a monomer having a carboxyl group is usually employed. A (meth)acrylic acid means an acrylic acid and/or a methacrylic acid. Examples of the alkyl (meth)acrylate monomer include methyl (meth)acrylate, ethyl (meth)acrylate, n-propyl (meth)acrylate, sec-propyl (meth)acrylate, n-butyl (meth)acrylate, sec-butyl (meth)acrylate, tert-butyl (meth)acrylate, isoamyl (meth)acrylate, n-hexyl (meth)acrylate, cyclohexyl (meth)acrylate, n-octyl (meth)acrylate, isooctyl (meth)acrylate, 2-ethylhexyl (meth)acrylate, undecyl (meth)acrylate, and lauryl (meth)acrylate. The above-described alkyl (meth)acrylate is usually copolymerized at a ratio of 30 to 99.5 parts by mass in the acrylic adhesive.

Examples of the monomer having a carboxyl group forming an acrylic resin adhesive include a monomer containing a carboxyl group such as a (meth)acrylic acid, an itaconic acid, a crotonic acid, a maleic acid, a monobutyl maleate, and β-carboxy ethyl acrylate.

With the acrylic resin adhesive, a monomer having another functional group other than the above may be copolymerized as long as the property of the acrylic resin adhesive is not compromised. Examples of the monomer having another functional group include: a monomer having a functional group such as a monomer containing a hydroxyl group such as 2-hydroxyethyl (meth)acrylate, 2-hydroxy propyl (meth)acrylate, and allyl alcohol; a monomer containing an amide group such as (meth)acrylamide, N-methyl (meth)acrylamide, and N-ethyl (meth)acrylamide; a monomer containing a methylol group and an amide group such as N-methylol (meth)acrylamide and dimethylol (meth) acrylamide; a monomer containing an amino group such as aminomethyl (meth)acrylate, dimethylamino ethyl (meth) acrylate, and vinyl pyridine; a monomer containing an epoxy group such as allyl glycidyl ether, or (meth)acrylate glycidyl ether. Examples of the monomer having another functional group other than the above include fluorine substituted alkyl (meth)acrylate, (meth)acrylonitrile, an aromatic compound containing a vinyl group such as styrene and methyl styrene, vinyl acetate, a halogenated vinyl compound.

For the acrylic resin adhesive, other than the monomer having a functional group as described above, another monomer having an ethylenic double bond can be used. Examples of the monomer having an ethylenic double bond include a diester of an α,β-unsaturated dibasic acid such as dibutyl maleate, dioctyl maleate, or dibutyl fumarate; a vinyl ester such as vinyl acetate, vinyl propionate; vinyl ether; a vinyl aromatic compound such as styrene, α-methyl styrene, and vinyl toluene; and (meth)acrylonitrile. Other than the monomer having an ethylenic double bond as described above, a compound having two or more ethylenic double bonds may be used in combination. Examples of such a compound include divinylbenzene, diallyl maleate, diallyl phthalate, ethylene glycol di(meth)acrylate, trimethylol propane tri(meth)acrylate, and methylene bis(meth)acrylamide.

Further, other than the monomers as described above, a monomer having an alkoxy alkyl chain or the like can be used. Examples of the alkoxyalkyl (meth)acrylate include 2-methoxyethyl (meth)acrylate, methoxyethyl (meth)acrylate, 2-methoxypropyl (meth)acrylate, 3-methoxypropyl (meth)acrylate, 2-methoxybutyl (meth)acrylate, 4-methoxybutyl (meth)acrylate, 2-ethoxyethyl (meth)acrylate, 3-ethoxypropyl (meth)acrylate, and 4-ethoxybutyl (meth)acrylate.

As the adhesive composition, other than the above-described acrylic resin adhesive, a homopolymer of a alkyl (meth)acrylate monomer may also be used. Examples of the (meth)acrylate homopolymer include methyl poly(meth)acrylate, ethyl poly(meth)acrylate, propyl poly(meth)acrylate, butyl poly(meth)acrylate, and octyl poly(meth)acrylate. Examples of a copolymer containing two types of acrylic acid ester units include ethyl (meth)acrylate-methyl (meth)acrylate copolymer, butyl (meth)acrylate-methyl (meth)acrylate copolymer, 2-hydroxyethyl (meth)acrylate-methyl (meth)acrylate copolymer, and methyl (meth)acrylate-2-hydroxy 3-phenyloxypropyl (meth)acrylate copolymer. Examples of a copolymer of a (meth)acrylic ester and another functional monomer include a methyl (meth)acrylate-styrene copolymer, a methyl (meth)acrylate-ethylene copolymer, and a methyl (meth)acrylate-2-hydroxyethyl (meth)acrylate-styrene copolymer.

For the adhesive, those commercially available may be used, and examples thereof include SK-Dyne 2094, SK-Dyne 2147, SK-Dyne 1811L, SK-Dyne 1442, SK-Dyne 1435, and SK-Dyne 1415 (manufactured by Soken Chemical & Engineering Co., Ltd.), Oribain EG-655, and Oribain BPS5896 (manufactured by TOYO INK CO., LTD.) or the like (trade name), which can be suitably used.

(Reflection Protection Layer)

A reflection protection layer is a layer for preventing a reflection or a reflection of an external light on the outermost surface of the sheet-form transparent molding or a layered body thereof. The reflection protection layer may be layered only on one side, on the viewer side of the sheet-form transparent molding or the layered body thereof or the opposite side, or may be layered on both of the sides. Especially when such molding is used as a reflection type transparent screen, the reflection protection layer is preferably layered on the viewer side. The reflection protection layer is preferably formed by using a resin which does not compromise the transmission visibility or a desired optical property of the sheet-form transparent molding or the layered body thereof. For such a resin, for example, a resin cured by an ultraviolet light/electron beam, i.e., an ionizing radiation-curable resin, those obtained by mixing a thermoplastic resin and a solvent to an ionizing radiation-curable resin, and a thermoset resin can be used. Among these, an ionizing radiation-curable resin is particularly preferable.

A method of forming the reflection protection layer is not particularly limited, and a dry coating method such as pasting of a coating film, or direct deposition or sputtering on a film substrate; and a wet coating treatment method such as gravure coating, microgravure coating, bar coating, slide die coating, slot die coating, and dip coating may be used.

<Method for Manufacturing Sheet-form Transparent Molding>

A method for manufacturing a sheet-form transparent molding according to the present invention comprises a forming step of a transparent light scattering layer and of a transparent reflection layer comprising a layering step when a transparent reflection layer is layered. The forming step of the transparent light scattering layer is a step in which molding can be processed according to known methods such as extrusion molding comprising kneading and film manufacturing process, casting film manufacturing method, coating method such as spin coating, die coating, dip coating, bar coating, flow coating roll coating, and gravure coating, injection molding, calendering molding, blow molding, compression molding, and cell casting method; and in view of the wide range of the film thickness that can be manufactured, extrusion or injection molding method can be suitably used. In the following, each step of the extrusion molding method will be described in details.

(Kneading Process)

A kneading process is a process where, using a kneading extruder, the above-described resin and microparticles are kneaded to obtain a resin composition. As the kneading extruder, a single- or a twin-screw kneading extruder may be used. When a twin-screw kneading machine is used, the process will be where the resin and the microparticles as above are kneaded while applying a shear stress, preferably from 3 to 1,800 KPa, more preferably from 6 to 1,400 KPa on average over the whole length of a screw of the twin-screw kneading extruder to obtain a resin composition. When the shear stress within the above-described range, the microparticles can be sufficiently dispersed in the resin. In particular, when the shear stress is 3 KPa or higher, the dispersion homogeneity of the microparticles can be more improved, and when the shear stress is 1,800 KPa or less, degradation of the resin is prevented, thereby preventing contamination of an air bubble in the transparent light scattering layer. The shear stress can be set in a desired range by regulating the twin-screw kneading extruder. In the present invention, a resin (master batch) to which microparticles are added in advance and a resin to which microparticles are not added may be mixed together to be kneaded by a single- or a twin-screw kneading extruder, thereby obtaining a resin composition. The above description is one example of a kneading process, and a resin (mater batch) to which microparticles are added in advance may be prepared by a single-screw extruder, or a master batch may be prepared by adding a commonly known dispersing agent.

To the resin composition, other than the resin and the microparticles, conventionally known additives may be added as long as the transmission visibility or a desired optical performance of the sheet-form transparent molding is not compromised. Examples of the additives include an antioxidant, a lubricant, an ultraviolet absorber, a compatibilizer, a nucleating agent, and a stabilizer. The resin and the microparticles are as described above.

A twin-screw kneading extruder used in the kneading process comprises a cylinder and two screws therein and is configured by combining screw elements. For the screw, a flight screw at least including a conveying element and a kneading element is suitably used. The kneading element preferably includes at least one selected from the group consisting of a kneading element, a mixing element, and a rotary element. By using such flight screw including a kneading element, the microparticles can be sufficiently dispersed in the resin while applying a desired shear stress.

(Film Manufacturing Process)

A film manufacturing process is a process in which a film is made of the resin composition obtained in the kneading process. A film manufacturing method is not particularly limited, and a sheet-form transparent molding consisted of a resin composition can be made by a conventionally known method. For example, the resin composition obtained in the kneading process is provided to a melt extruder heated to a temperature (Tm to Tm+70° C.) of the melting point or higher to melt the resin composition. For the melt extruder, a single-screw extruder, a twin-screw extruder, a vent extruder, or a tandem extruder can be used depending on the purposes.

Subsequently, the molten resin composition is, for example, extruded into a sheet form by a die such as a T-die, and the extruded sheet-form article is rapidly quenched and solidified by a revolving cooling drum or the like, thereby forming a sheet-form molding. When the film manufacturing process is performed continuously with the above-described kneading process, the resin composition obtained in the kneading process in a molten state may be directly extruded from a die to form a sheet-form transparent light scattering layer.

The transparent light scattering layer in sheet-form obtained in the film manufacturing process can be further uniaxially or biaxially stretched by a conventionally known method. Stretching of the above-described transparent light scattering layer can improve the mechanical strength.

(Layering Process)

A layering process is a process to further layer a transparent reflection layer on the sheet-form transparent light scattering layer as obtained in the film manufacturing process, in a case where a transparent reflection layer is to be provided. The method to layer the transparent reflection layer is not particularly limited and can be performed by a conventionally known method. For example, the transparent reflection layer can be formed by deposition, sputtering, or coating.

<Transparent Screen>

The transparent screen according to the present invention comprises the sheet-form transparent molding to described above. Here, the transparent screen comprises the transmission type and the reflection type screen. The transparent screen may only comprise the sheet-form transparent molding described above, or may further comprise a support such as a transparent partition. The transparent screen may be planar, curved, or may have a concave-convex surface. When the transparent screen is used as a reflection type screen, a preferred embodiment is where the viewer visualizes an image from the transparent light scattering side of the above-mentioned sheet-form transparent molding.

In the image display device comprising the transparent screen according to the present invention, the position of the light source may be at the viewer side against the screen or at the opposite side of the viewer. Such transparent screen has excellent visibility of the projected light since the projected light emitted from the light source is scattered and reflected anisotropically, and further has a wide viewing angle and excellent visibility of the transmitted light.

(Support)

A support is for supporting the sheet-form transparent molding. Any support may be used as long as it does not compromise the transmission visibility or a desired optical property of the reflection type screen, and examples thereof include a transparent partition, a glass window, a head-up display for a vehicle, and a wearable display, etc.

<Member for Vehicle>

A member for a vehicle according to the present invention comprises the sheet-form transparent molding or the transparent screen as described above and may be one which further comprises a reflection protection layer or the like. Examples of the member for a vehicle include a windshield or a side glass. When the member for a vehicle comprises the sheet-form transparent molding or the transparent screen described above, a clear image can be displayed on the member for a vehicle without providing a separate screen.

<Member for House>

A member for a house according to the present invention comprises the sheet-form transparent molding or the transparent screen described above and may be one which further comprises a reflection protection layer or the like. Examples of the member for a house include a window glass for a house, a glass wall for a convenient store or a shop along the street. When the member for a house comprises the sheet-form transparent molding or the transparent screen described above, a clear image can be displayed on the member for a house without providing a separate screen.

<Image Projection Device>

An image projection device according to the present invention comprises the above-described sheet-form transparent molding or the reflection type screen that allows perspective view and a projection device. The projection device is not particularly limited, as long as the device can project an image on a screen, and for example, a commercially available front projector can be used.

Figure 2:
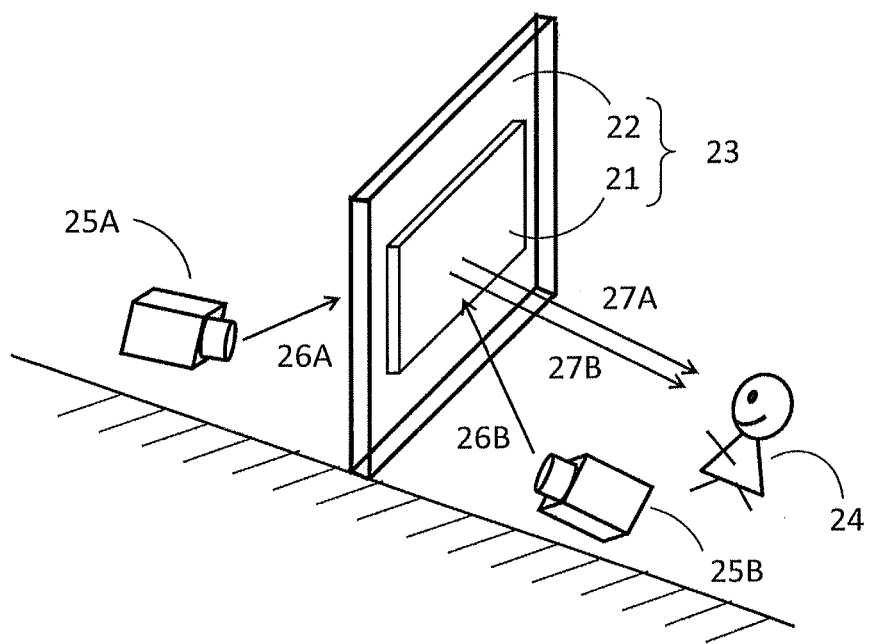
FIG. 2 is a schematic diagram of one embodiment of a transparent screen and an image projection device according to the present invention.

FIG. 2 is a schematic diagram illustrating one embodiment of a transparent screen and an image projection device according to the present invention. A transparent screen 23 comprises a transparent partition (a support) 22 and a sheet-form transparent molding 21 on the transparent partition 22 on a viewer 24 side. The sheet-form transparent molding 21 may include an adhesive layer to stick to the transparent partition 22. In case of a transmission type screen, the image projection device comprises the transparent screen 23 and a projection device 25A provided on the opposite side (the back side) of the viewer 24 with respect to the transparent partition 22. A projected light 26A emitted from the projection device 25A enters from the back side of the transparent screen 23 and anisotropically diffuses by the transparent screen 23, whereby the viewer 24 can visually recognize a diffused light 27A. On the other hand, in case of a reflection type screen, the image projection device comprises the transparent screen 23 and a projection device 25B provided on the same side (the front side) of the viewer 24 with respect to the transparent partition 22. A projected light 26B emitted from the projection device 25B enters from the front side of the transparent screen 23 and anisotropically diffuses by the transparent screen 23, whereby the viewer 24 can visually recognize a diffused light 27B.

EXAMPLES

In the following, the present invention will be more specifically described with reference to Examples and Comparative Examples, but the present invention should not be construed to be limited to the following Examples.

The measuring methods of various physicalities and performance evaluation in the Examples and the Comparative Examples are as follows.

(1) Haze

Haze was measured by using a turbidimeter (Part No.: NDH-5000; manufactured by NIPPON DENSHOKU INDUSTRIES CO., LTD.) in accordance with JIS K 7136.

(2) Total Light Transmittance

Total light transmittance was measured by using a turbidimeter (Part No.: NDH-5000; manufactured by NIPPON DENSHOKU INDUSTRIES CO., LTD.) in accordance with JIS K 7361-1.

(3) Diffusion Transmittance

Diffusion transmittance was measured by using a turbidimeter (Part No.: NDH-5000; manufactured by NIPPON DENSHOKU INDUSTRIES CO., LTD.) in accordance with JIS K 7136-1.

(4) Reflected Frontal Luminous Intensity

Reflected frontal luminous intensity was measured by using a goniophotometer (Part No.: GC5000L; manufactured by NIPPON DENSHOKU INDUSTRIES CO., LTD.). An entering angle of a light source was set to 45 degrees, and a reflected light intensity in the direction of 0 degree when a standard white-colored plate with whiteness degree of 95.77 was placed on the measuring stage was 100. When a sample was measured, the entering angle of the light source was set to 15 degrees, corresponding to a set angle of a common projector, and the intensity of the reflected light in the direction of 0 degree was measured.

(5) Transmitted Frontal Luminous Intensity

Transmitted frontal luminous intensity was measured by using a goniophotometer (Part No.: GC5000L; manufactured by NIPPON DENSHOKU INDUSTRIES CO., LTD.). An entering angle of a light source was set to 0 degree, and a transmitted light intensity in the direction of 0 degree with nothing placed on the measuring stage was 100. When a sample was measured, the entering angle of the light source was set to 15 degrees, and the intensity of the transmitted light in the direction of 0 degree was measured.

(6) Viewing angle

Viewing angle was measured by using a goniophotometer (Part No.: GC5000L; manufactured by NIPPON DENSHOKU INDUSTRIES CO., LTD.). An entering angle of a light source was set to 0 degree, and a transmitted light intensity in the direction of 0 degree with nothing placed on the measuring stage was 100. When a sample was measured, the transmitted light intensity was measured by 1 degree from −85 degrees to +85 degrees with the entering angle of the light source kept at 0 degree. Among the measured range, the range having the transmitted light intensity of 0.001 or higher was the viewing angle.

(7) Regular Reflectance

Regular reflectance was measured by using a spectrophotometer (Part No.: CM-3500d; manufactured by KONICA MINOLTA INC.). A powder material dispersed in an appropriate solvent (water or methyl ethyl ketone) was coated on a glass slide such that the film thickness will be 0.5 mm or more and dried. Using this obtained glass plate with the coated film, the regular reflectance of the film-coated part from the glass surface was measured.

(8) Image Clarity

Image clarity is a value of definition (%) when measured by using an image clarity measuring device (Part No.: ICM-IT; manufactured by Suga Test Instruments Co., Ltd.), with an optical comb having a width of 0.125 mm in accordance with JIS K7374. The larger the value of the definition, the higher is the transmission image clarity.

(9) Screen Performance

An image was projected on the sheet made as a transparent screen as described below by using a mobile LED mini projector PP-D1S, manufactured by Onkyo Digital Solutions Corporation, from a position 50 cm away in an angle of 15 degrees against a normal line direction. Then, after adjusting a focus knob of the projector to bring focus on the screen surface, the image displayed on the screen was visually evaluated from 2 places: 1 m in frontward from the screen (the same side as the projector against the screen; so-called a front projection); and 1 m backward from the screen (the opposite side of the projector against the screen; so-called a rear projection), under the following evaluation criteria. Performance as a reflection type screen can be evaluated by observing from the front of the screen and performance as a transmission type screen can be evaluated by observing from the back of the screen.

[Evaluation Criteria]

⊚: A significantly clear image was visualized

○: A clear image was visualized

Δ: An image was visualized with slightly fuzzy outline and color phase x: An image was visualized with fuzzy outline and unsuitable to be used as a screen Example 1

(1) Manufacturing of thermoplastic resin pellet to which microparticles are added (hereinafter referred to as "Manufacturing Process of Pellet")

For a thermoplastic resin pellet, a polyethylene terephthalate resin (PET) pellet (Trade Name: IP121B; manufactured by Bell Polyester Products, Inc.) was prepared. To this PET pellet, 0.0085% by mass of flake-form aluminum microparticles A (average diameter of the primary particles: 10 μm; aspect ratio: 300; regular reflectance: 62.8%), based on the PET pellet, were added as bright flake-form microparticles and was mixed with a rotating mixer to obtain a PET pellet in which the flake-form aluminum microparticles are uniformly adhered to the surface of the PET pellet.

(2) Manufacturing of transparent light scattering layer (sheet-form transparent molding) (hereinafter referred to as "Manufacturing Process of Sheet")

The microparticles-added PET pellet as obtained was introduced into a hopper of a twin-screw kneading extruder (Trade Name: KZW-30MG; manufactured by TECHNOVEL CORPORATION) to make a transparent light scattering layer (a sheet-form transparent molding) in a thickness of 80 μm. The screw diameter of the twin-screw kneading extruder was 20 mm, and the active length (L/D) of the screw was 30. A hangar coat type T-die was installed to the twin-screw kneading extruder through an adapter. The extrusion temperature was 270° C., the number of screw revolution was 500 rpm, and the sheer stress was 300 KPa. The used screw had the total length of 670 mm, comprised a mixing element in a portion between a position 160 mm and a position 185 mm from the hopper side of the screw and a kneading element in a portion between a position 185 mm and a position 285 mm from the hopper side of the screw, and other portions of the screw had a flight shape.

(3) Evaluation of transparent screen

When the transparent light scattering layer (the sheet-form transparent molding) as made was used directly as the transparent screen, the haze value was 4.3%, the diffusion transmittance was 3.7%, the total light transmission was 86.0%, and the transparency was high.

The transmitted frontal luminous intensity (×1000) measured with the goniophometer was 1.02, which was found to result in excellent transmitted frontal luminous intensity. The reflected frontal luminous intensity measured with the goniophometer was 8.9, which was found to result in excellent reflected frontal luminous intensity. The viewing angle measured with the goniophometer was ±14 degrees, which was found to result in excellent viewing angle property. The image clarity was 92%, and the image seen transmitted to through the screen was clear. Upon visually evaluating the visibility, the image was able to be clearly visualized both from the front and the back, and especially, the image was clear when observed from the front.

Example 2

A transparent light scattering layer (a sheet-form transparent molding) in a film thickness of 100 μm was made in the same manner as Example 1, except that the added amount of the flake-form aluminum microparticles A was changed to 0.014% by mass in the Manufacturing Process of Pellet (1) of Example 1.

When the transparent light scattering layer (the sheet-form transparent molding) as made was used directly as the transparent screen, the haze value was 5.8%, the diffusion transmittance was 5.1%, the total light transmission was 87.4%, and the transparency was high.

The transmitted frontal luminous intensity (×1000) measured with the goniophometer was 1.64, which was found to result in excellent transmitted frontal luminous intensity. The reflected frontal luminous intensity measured with the goniophometer was 14.4, which was found to result in excellent reflected frontal luminous intensity. The viewing angle measured with the goniophometer was ±17 degrees, which was found to result in excellent viewing angle property. The image clarity was 87%, and the image seen transmitted through the screen was clear. Upon visually evaluating the visibility, the image was able to be clearly visualized both from the front and the back, and especially, the image was clear when observed from the front.

Example 3

A transparent light scattering layer (a sheet-form transparent molding) in a film thickness of 80 μm was made in the same manner as Example 1, except that the added amount of the flake-form aluminum microparticles A was changed to 0.042% by mass in the Manufacturing Process of Pellet (1) of Example 1.

When the transparent light scattering layer (the sheet-form transparent molding) as made was used directly as the transparent screen, the haze value was 17.1%, the diffusion transmittance was 12.1%, the total light transmission was 71.0%, and the transparency was sufficient, although slightly inferior to Example 2.

The transmitted frontal luminous intensity (×1000) measured with the goniophometer was 3.51, which was found to result in excellent transmitted frontal luminous intensity. The reflected frontal luminous intensity measured with the goniophometer was 32.0, which was found to result in excellent reflected frontal luminous intensity. The viewing angle measured with the goniophometer was ±25 degrees, which was found to result in excellent viewing angle property. The image clarity was 82%, and the image seen transmitted through the screen was clear. Upon visually evaluating the visibility, the image was able to be clearly visualized both from the front and the back, and especially, the image was clear when observed from the front.

Example 4

A transparent light scattering layer (a sheet-form transparent molding) in a film thickness of 100 μm was made in the same manner as Example 1, except that 0.0085% by mass of flake-form aluminum microparticles B (average diameter of the primary particles: 7 μm; aspect ratio: 40; regular reflectance: 24.6%), based on the PET pellet, was added as the bright flake-form microparticles in the Manufacturing Process of Pellet (1) of Example 1.

When the transparent light scattering layer (the sheet-form transparent molding) as made was used directly as the transparent screen, the haze value was 4.1%, the diffusion transmittance was 3.6%, the total light transmission was 87.4%, and the transparency was high.

The transmitted frontal luminous intensity (×1000) measured with the goniophometer was 0.85, which was found to result in excellent transmitted frontal luminous intensity. The reflected frontal luminous intensity measured with the goniophometer was 5.7, which was found to result in excellent reflected frontal luminous intensity. The viewing angle measured with the goniophometer was ±14 degrees, which was found to result in excellent viewing angle property. The image clarity was 92%, and the image seen transmitted through the screen was clear. Upon visually evaluating the visibility, the image was able to be clearly visualized both from the front and the back, and especially, the image was clear when observed from the front.

Example 5

A transparent light scattering layer (a sheet-form transparent molding) in a film thickness of 100 μm was made in the same manner as Example 4, except that the added amount of the flake-form aluminum microparticles B was changed to 0.014% by mass in the Manufacturing Process of Pellet (1) of Example 4.

When the transparent light scattering layer (the sheet-form transparent molding) as made was used directly as the transparent screen, the haze value was 6.4%, the diffusion transmittance was 5.5%, the total light transmission was 85.9%, and the transparency was high.

The transmitted frontal luminous intensity (×1000) measured with the goniophometer was 1.55, which was found to result in excellent transmitted frontal luminous intensity. The reflected frontal luminous intensity measured with the goniophometer was 7.2, which was found to result in excellent reflected frontal luminous intensity. The viewing angle measured with the goniophometer was ±16 degrees, which was found to result in excellent viewing angle property. The image clarity was 86%, and the image seen transmitted through the screen was clear. Upon visually evaluating the visibility, the image was able to be clearly visualized both from the front and the back, and especially, the image was clear when observed from the front.

Example 6

A transparent light scattering layer (a sheet-form transparent molding) in a film thickness of 100 μm was made in the same manner as Example 4, except that the added amount of the flake-form aluminum microparticles B was changed to 0.04% by mass in the Manufacturing Process of Pellet (1) of Example 4.

When the transparent light scattering layer (the sheet-form transparent molding) as made was used directly as the transparent screen, the haze value was 9.4%, the diffusion transmittance was 7.3%, the total light transmission was 77.9%, and the transparency was sufficient, although slightly inferior to Example 1.

The transmitted frontal luminous intensity (×1000) measured with the goniophometer was 1.94, which was found to result in excellent transmitted frontal luminous intensity. The reflected frontal luminous intensity measured with the goniophometer was 19.9, which was found to result in excellent reflected frontal luminous intensity. The viewing angle measured with the goniophometer was ±19 degrees, which was found to result in excellent viewing angle property. The image clarity was 81%, and the image seen transmitted through the screen was clear. Upon visually evaluating the visibility, the image was able to be clearly visualized both from the front and the back, and especially, the image was clear when observed from the front.

Example 7

A transparent light scattering layer (a sheet-form transparent molding) in a film thickness of 100 µm was made in the same manner as Example 1, except that 0.010% by mass of titanium oxide ($TiO_2$)-coated mica (Trade Name: Helios R10S; manufactured by TOPY INDUSTRIES LIMITED; average diameter of the primary particles: 12 µm; aspect ratio: 80; regular reflectance: 16.5%) was used as the bright flake-form microparticles in the Manufacturing Process of Pellet (1) of Example 1.

When the transparent light scattering layer (the sheet-form transparent molding) as made was used directly as the transparent screen, the haze value was 2.1%, the diffusion transmittance was 1.9%, the total light transmission was 89.0%, and the transparency was high.

The transmitted frontal luminous intensity (×1000) measured with the goniophometer was 0.46, which was found to result in excellent transmitted frontal luminous intensity. The reflected frontal luminous intensity measured with the goniophometer was 4.9, which was found to result in excellent reflected frontal luminous intensity. The viewing angle measured with the goniophometer was ±10 degrees, which was found to result in excellent viewing angle property. The image clarity was 80%, and the image seen transmitted through the screen was clear. Upon visually evaluating the visibility, the image was able to be clearly visualized both from the front and the back, and especially, the image was clear when observed from the front.

Example 8

A transparent light scattering layer (a sheet-form transparent molding) in a film thickness of 80 µm was made in the same manner as Example 1, except that 0.0085% by mass of the flake-form aluminum microparticles A as the bright flake-form microparticles and 0.15% by mass of zirconium oxide ($ZrO_2$) particles (median diameter of the primary particles: 10 nm; refractive index: 2.40) as substantially spherical microparticles were added in the Manufacturing Process of Pellet (1) of Example 1.

When the transparent light scattering layer (the sheet-form transparent molding) as made was used directly as the transparent screen, the haze value was 11.6%, the diffusion transmittance was 10.0%, the total light transmission was 86.8%, and the transparency was high.

The transmitted frontal luminous intensity (×1000) measured with the goniophometer was 13.04, which was found to result in excellent transmitted frontal luminous intensity. The reflected frontal luminous intensity measured with the goniophometer was 3.1, which was found to result in excellent reflected frontal luminous intensity. The viewing angle measured with the goniophometer was ±23 degrees, which was found to result in excellent viewing angle property. The image clarity was 79%, and the image seen transmitted through the screen was clear. Upon visually evaluating the visibility, the image was able to be significantly clearly visualized both from the front and the back.

Example 9

A transparent light scattering layer (a sheet-form transparent molding) in a film thickness of 80 µm was made in the same manner as Example 1, except that 0.002% by mass of flake-form aluminum microparticles C (average diameter of the primary particles: 1 µm; 40 nm thick; aspect ratio: 25; regular reflectance: 16.8%), based on the PET pellet, was added as the bright flake-form microparticles in the Manufacturing Process of Pellet (1) of Example 1.

When the transparent light scattering layer (the sheet-form transparent molding) as made was used directly as the transparent screen, the haze value was 1.8%, the diffusion transmittance was 1.6%, the total light transmission was 89.0%, and the transparency was high.

The transmitted frontal luminous intensity (×1000) measured with the goniophometer was 0.79, which was found to result in excellent transmitted frontal luminous intensity. The reflected frontal luminous intensity measured with the goniophometer was 5.0, which was found to result in excellent reflected frontal luminous intensity. The viewing angle measured with the goniophometer was ±14 degrees, which was found to result in excellent viewing angle property. The image clarity was 83%, and the image seen transmitted through the screen was clear. Upon visually evaluating the visibility, the image was able to be clearly visualized both from the front and the back, and especially, the image was clear when observed from the front.

Example 10

A transparent light scattering layer (a sheet-form transparent molding) in a film thickness of 80 µm was made in the same manner as Example 9, except that the added amount of the flake-form aluminum microparticles C was changed to 0.004% by mass in the Manufacturing Process of Pellet (1) of Example 9.

When the transparent light scattering layer (the sheet-form transparent molding) as made was used directly as the transparent screen, the haze value was 3.7%, the diffusion transmittance was 3.2%, the total light transmission was 87.0%, and the transparency was high.

The transmitted frontal luminous intensity (×1000) measured with the goniophometer was 1.49, which was found to result in excellent transmitted frontal luminous intensity. The reflected frontal luminous intensity measured with the goniophometer was 6.9, which was found to result in excellent reflected frontal luminous intensity. The viewing angle measured with the goniophometer was ±20 degrees, which was found to result in excellent viewing angle property. The image clarity was 84%, and the image seen transmitted through the screen was clear. Upon visually evaluating the visibility, the image was able to be clearly visualized both from the front and the back, and especially, the image was clear when observed from the front.

Example 11

To one side of a transparent light scattering layer, made by a process in a similar manner as Example 10 except that the film thickness was made 100 µm, zinc sulfide (ZnS) was layered by deposition such that the thickness will be 40 nm and a transparent reflection layer was formed to obtain a sheet-form transparent molding.

When the sheet-form transparent molding as made was used directly as the transparent screen, the haze value was 4.4%, the diffusion transmittance was 3.5%, the total light transmission was 80.0%, and the transparency was sufficient.

The transmitted frontal luminous intensity (×1000) measured with the goniophometer was 1.02, which was found to result in excellent transmitted frontal luminous intensity. The reflected frontal luminous intensity measured with the goniophometer was 23.3, which was found to result in excellent reflected frontal luminous intensity. The viewing angle measured with the goniophometer was ±22 degrees, which was found to result in excellent viewing angle property. The image clarity was 75%, and the image seen transmitted through the screen was clear. Upon visually evaluating the visibility, the image was able to be clearly visualized both from the front and the back, and especially, the image was clear when observed from the front.

Example 12

A transparent light scattering layer (a sheet-form transparent molding) in a film thickness of 100 μm was made in the same manner as Example 1, except that the added amount of titanium oxide ($TiO_2$)-coated mica was 3.0% by mass in the Manufacturing Process of Pellet (1) of Example 7.

When the transparent light scattering layer (the sheet-form transparent molding) as made was used directly as the transparent screen, the haze value was 18.2%, the diffusion transmittance was 13.1%, the total light transmission was 72.0%, and the transparency was sufficient, although slightly inferior to Example 7.

The transmitted frontal luminous intensity (×1000) measured with the goniophometer was 3.71, which was found to result in excellent transmitted frontal luminous intensity. The reflected frontal luminous intensity measured with the goniophometer was 36.0, which was found to result in excellent reflected frontal luminous intensity. The viewing angle measured with the goniophometer was ±29 degrees, which was found to result in excellent viewing angle property. The image clarity was 71%, and the image seen transmitted through the screen was clear. Upon visually evaluating the visibility, the image was able to be clearly visualized both from the front and the back, and especially, the image was clear when observed from the front.

Example 13

A transparent light scattering layer (a sheet-form transparent molding) in a film thickness of 80 μm was made in the same manner as Example 8, except that the added amount of the $ZrO_2$ particles was 0.001% by mass in the Manufacturing Process of Pellet (1) of Example 8.

When the transparent light scattering layer (the sheet-form transparent molding) as made was used directly as the transparent screen, the haze value was 4.6%, the diffusion transmittance was 4.0%, the total light transmission was 86.4%, and the transparency was high.

The transmitted frontal luminous intensity (×1000) measured with the goniophometer was 1.02, which was found to result in excellent transmitted frontal luminous intensity. The reflected frontal luminous intensity measured with the goniophometer was 9.2, which was found to result in excellent reflected frontal luminous intensity. The viewing angle measured with the goniophometer was ±15 degrees, which was found to result in excellent viewing angle property. The image clarity was 88%, and the image seen transmitted through the screen was clear. Upon visually evaluating the visibility, the image was able to be significantly clearly visualized both from the front and the back.

Example 14

A transparent light scattering layer (a sheet-form transparent molding) in a film thickness of 80 μm was made in the same manner as Example 8, except that 0.15% by mass of acrylic resin particles (refractive index: 1.51) was added as the substantially spherical microparticles instead of the $ZrO_2$ particles in the Manufacturing Process of Pellet (1) of Example 8.

When the transparent light scattering layer (the sheet-form transparent molding) as made was used directly as the transparent screen, the haze value was 13.1%, the diffusion transmittance was 11.1%, the total light transmission was 85.0%, and the transparency was high.

The transmitted frontal luminous intensity (×1000) measured with the goniophometer was 11.20, which was found to result in excellent transmitted frontal luminous intensity. The reflected frontal luminous intensity measured with the goniophometer was 2.8, which was found to result in excellent reflected frontal luminous intensity. The viewing angle measured with the goniophometer was ±22 degrees, which was found to result in excellent viewing angle property. The image clarity was 73%, and the image seen transmitted through the screen was clear. Upon visually evaluating the visibility, the image was able to be significantly clearly visualized both from the front and the back.

Example 15

A transparent light scattering layer (a sheet-form transparent molding) in a film thickness of 20 μm was made in the same manner as Example 1, except that a PMMA pellet (Trade Name: ACRYPET VH; manufactured by Mitsubishi Rayon Co., Ltd.) was used instead of the PET pellet as the thermoplastic resin and 0.85% by mass of silver particles (average diameter of the primary particles: 1 μm; aspect ratio: 200; regular reflectance: 32.8%) was used instead of the flake-form aluminum microparticles A as the bright flake-form microparticles in the Manufacturing Process of Pellet (1) of Example 1.

When the transparent light scattering layer (the sheet-form transparent molding) as made was used directly as the transparent screen, the haze value was 5.4%, the diffusion transmittance was 3.8%, the total light transmission was 70.1%, and the transparency was high.

The transmitted frontal luminous intensity (×1000) measured with the goniophometer was 1.32, which was found to result in excellent transmitted frontal luminous intensity. The reflected frontal luminous intensity measured with the goniophometer was 13.8, which was found to result in excellent reflected frontal luminous intensity. The viewing angle measured with the goniophometer was ±15 degrees, which was found to result in excellent viewing angle property. The image clarity was 75%, and the image seen transmitted to through the screen was clear. Upon visually evaluating the visibility, the image was able to be clearly visualized both from the front and the back, and especially, the image was clear when observed from the front.

Example 16

A transparent light scattering layer (a sheet-form transparent molding) in a film thickness of 40 μm was made in the same manner as Example 1, except that a polycarbonate (PC) pellet (Trade Name: SD2201W; manufactured by Sumika Styron Polycarbonate Limited) was used instead of the PET pellet as the thermoplastic resin and 0.25% by mass of nickel particles (average diameter of the primary particles: 9 μm; aspect ratio: 90; regular reflectance: 16.8%) was used instead of the flake-form aluminum microparticles A as the bright flake-form microparticles in the Manufacturing Process of Pellet (1) of Example 1.

When the transparent light scattering layer (the sheet-form transparent molding) as made was used directly as the transparent screen, the haze value was 6.3%, the diffusion transmittance was 5.2%, the total light transmission was 82.5%, and the transparency was high.

The transmitted frontal luminous intensity (×1000) measured with the goniophometer was 1.14, which was found to result in excellent transmitted frontal luminous intensity. The reflected frontal luminous intensity measured with the goniophometer was 11.3, which was found to result in excellent reflected frontal luminous intensity. The viewing angle measured with the goniophometer was ±18 degrees, which was found to result in excellent viewing angle property. The image clarity was 71%, and the image seen transmitted through the screen was clear. Upon visually evaluating the visibility, the image was able to be clearly visualized both from the front and the back, and especially, the image observed from the front was clear.

Example 17

A transparent light scattering layer (a sheet-form transparent molding) in a film thickness of 10 μm was made in the same manner as Example 1, except that a cycloolefin polymer (COP) pellet (Trade Name: ZEONOR 1020R; manufactured by ZEON CORPORATION) was used instead of the PET pellet as the thermoplastic resin and 0.05% by mass of flake-form alminimu microparticles D (average diameter of the primary particles: 15 μm; aspect ratio: 750; regular reflectance: 68.9%) was used instead of the flake-form aluminum microparticles A as the bright flake-form microparticles in the Manufacturing Process of Pellet (1) of Example 1.

When the transparent light scattering layer (the sheet-form transparent molding) as made was used directly as the transparent screen, the haze value was 3.7%, the diffusion transmittance was 3.0%, the total light transmission was 80.9%, and the transparency was high.

The transmitted frontal luminous intensity (×1000) measured with the goniophometer was 2.72, which was found to result in excellent transmitted frontal luminous intensity. The reflected frontal luminous intensity measured with the goniophometer was 8.3, which was found to result in excellent reflected frontal luminous intensity. The viewing angle measured with the goniophometer was ±22 degrees, which was found to result in excellent viewing angle property. The image clarity was 71%, and the image seen transmitted through the screen was clear. Upon visually evaluating the visibility, the image was able to be clearly visualized both from the front and the back, and especially, the image was clear when observed from the front.

Example 18

A microparticles-containing pellet was obtained in the same manner as Example 1, except that 0.01% by mass of titanium oxide (TiO$_2$)-coated mica as the bright flake-form microparticles and 0.01% by mass of barium titanate (Ba-TiO$_3$) particles (median diameter of the primary particles: 26 nm; refractive index: 2.40; manufactured by Kanto Denka Kogyo Co., Ltd.) as the substantially spherical microparticles were added in the Manufacturing Process of Pellet (1) of Example 1. The obtained microparticles-containing pellet was used to make a transparent light scattering layer (a sheet-form transparent molding) in a film thickness of 500 μm with an injection molding machine (Trade Name: FNX-III; manufactured by Nissei Plastic Industrial Co., Ltd.).

When the transparent light scattering layer (the sheet-form transparent molding) as made was used directly as the transparent screen, the haze value was 5.2%, the diffusion transmittance was 4.0%, the total light transmission was 77.5%, and the transparency was high.

The transmitted frontal luminous intensity (×1000) measured with the goniophometer was 1.89, which was found to result in excellent transmitted frontal luminous intensity. The reflected frontal luminous intensity measured with the goniophometer was 4.5, which was found to result in excellent reflected frontal luminous intensity. The viewing angle measured with the goniophometer was ±24 degrees, which was found to result in excellent viewing angle property. The image clarity was 79%, and the image seen transmitted through the screen was clear. Upon visually evaluating the visibility, the image was able to be significantly clearly visualized both from the front and the back.

Example 19

A microparticles-containing pellet was obtained in the same manner as Example 1, except that 0.0002% by mass of flake-form aluminum microparticles C as the bright flake-form microparticles and 0.0002% by mass of titanium oxide (TiO$_2$) particles (median diameter of the primary particles: 13 nm; refractive index: 2.72; manufactured by TAYCA CORPORATION) as the substantially spherical microparticles were added in the Manufacturing Process of Pellet (1) of Example 1. The obtained microparticles-containing pellet was used to make a transparent light scattering layer (a sheet-form transparent molding) in a film thickness of 1000 μm with an injection molding machine (Trade Name: FNX-III; manufactured by Nissei Plastic Industrial Co., Ltd.).

When the transparent light scattering layer (the sheet-form transparent molding) as made was used directly as the transparent screen, the haze value was 6.6%, the diffusion transmittance was 4.7%, the total light transmission was 71.5%, and the transparency was high.

The transmitted frontal luminous intensity (×1000) measured with the goniophometer was 2.13, which was found to result in excellent transmitted frontal luminous intensity. The reflected frontal luminous intensity measured with the goniophometer was 8.2, which was found to result in excellent reflected frontal luminous intensity. The viewing angle measured with the goniophometer was ±17 degrees, which was found to result in excellent viewing angle property. The image clarity was 81%, and the image seen transmitted through the screen was clear. Upon visually evaluating the visibility, the image was able to be significantly clearly visualized both from the front and the back.

Example 20

A microparticles-containing pellet was obtained in the same manner as Example 1, except that 5.0% by mass of flake-form aluminum microparticles E (average diameter of the primary particles: 120 μm; aspect ratio: 38; regular reflectance: 25.5%) was used instead of the flake-form aluminum microparticles A as the bright flake-form microparticles in the Manufacturing Process of Pellet (1) of Example 1. The obtained microparticles-containing pellet was used to make a transparent light scattering layer (a sheet-form transparent molding) in a film thickness of 500 μm with an injection molding machine (Trade Name: FNX-III; manufactured by Nissei Plastic Industrial Co., Ltd.).

When the transparent light scattering layer (the sheet-form transparent molding) as made was used directly as the transparent screen, the haze value was 18.5%, the diffusion transmittance was 12.2%, the total light transmission was 66.0%, and the transparency was sufficient, although slightly inferior to Example 1.

The transmitted frontal luminous intensity (×1000) measured with the goniophometer was 10.5, which was found to result in excellent transmitted frontal luminous intensity. The reflected frontal luminous intensity measured with the goniophometer was 28.3, which was found to result in excellent reflected frontal luminous intensity. The viewing angle measured with the goniophometer was ±32 degrees, which was found to result in excellent viewing angle property. The image clarity was 80%, and the image seen transmitted through the screen was clear. Upon visually evaluating the visibility, the image was able to be clearly visualized both from the front and the back, and especially, the image was clear when observed from the front.

Example 21

A transparent light scattering layer (a sheet-form transparent molding) in a film thickness of 40 μm was made in the same manner as Example 9, except that the added amount of the flake-form aluminum microparticles C was 0.0001% by mass in the Manufacturing Process of Pellet (1) of Example 9.

When the transparent light scattering layer (the sheet-form transparent molding) as made was used directly as the transparent screen, the haze value was 1.2%, the diffusion transmittance was 1.1%, the total light transmission was 95.2%, and the transparency was high.

The transmitted frontal luminous intensity (×1000) measured with the goniophometer was 0.34, which was found to result in excellent transmitted frontal luminous intensity. The reflected frontal luminous intensity measured with the goniophometer was 1.8, which was found to result in excellent reflected frontal luminous intensity. The viewing angle measured with the goniophometer was ±12 degrees, which was found to result in excellent viewing angle property. The image clarity was 89%, and the image seen transmitted through the screen was clear. Upon visually evaluating the visibility, the image was able to be significantly clearly visualized both from the front and the back.

Example 22

A transparent light scattering layer (a sheet-form transparent molding) in a film thickness of 100 μm was made in the same manner as Example 8, except that the added amount of the $ZrO_2$ particles was 1.5% by mass in the Manufacturing Process of Pellet (1) of Example 8.

When the transparent light scattering layer (the sheet-form transparent molding) as made was used directly as the transparent screen, the haze value was 15.6%, the diffusion transmittance was 12.1%, the total light transmission was 77.3%, and the transparency was sufficient, although slightly inferior to Example 1.

The transmitted frontal luminous intensity (×1000) measured with the goniophometer was 11.3, which was found to result in excellent transmitted frontal luminous intensity. The reflected frontal luminous intensity measured with the goniophometer was 2.1, which was found to result in excellent reflected frontal luminous intensity. The viewing angle measured with the goniophometer was ±23 degrees, which was found to result in excellent viewing angle property. The image clarity was 65%, and the image seen transmitted through the screen was clear. Upon visually evaluating the visibility, the image was able to be significantly clearly visualized both from the front and the back.

Comparative Example 1

A transparent light scattering layer (a sheet-form transparent molding) in a film thickness of 80 μm was made in the same manner as Example 1, except that 0.15% by mass of substantially spherical particles $ZrO_2$ (median diameter of the primary particles: 10 nm; refractive index: 2.40) were added without addition of bright flake-form microparticles in the Manufacturing Process of Pellet (1) of Example 1.

When the transparent light scattering layer (the sheet-form transparent molding) as made was used directly as the transparent screen, the haze value was 9.0%, the diffusion transmittance was 8.1%, and the total light transmission was 90.0%. The transmitted frontal luminous intensity (×1000) measured with the goniophometer was 2.63, which was found to result in poor transmitted frontal luminous intensity. The reflected frontal luminous intensity measured with the goniophometer was 1.0, which was found to result in poor reflected frontal luminous intensity. The viewing angle measured with the goniophometer was ±20 degrees, which was found to result in excellent viewing angle property. The image clarity was 78%, and the image seen transmitted through the screen was clear; however, upon visually evaluating the visibility, the brightness was low and a clear image was unable to be visualized, and especially, the image was unclear when observed from the front.

Comparative Example 2

A transparent light scattering layer (a sheet-form transparent molding) in a film thickness of 80 μm was made in the same manner as Example 1, except that 0.2% by mass of mica particles (Trade Name: A-21S; manufactured by YAMAGUCHI MICA CO., LTD.; average diameter of the primary particles: 23 nm; aspect ratio: 70; regular reflectance: 9.8%) as the flake-form microparticles without brightness were added without addition of bright flake-form microparticles in the Manufacturing Process of Pellet (1) of Example 1.

When the transparent light scattering layer (the sheet-form transparent molding) as made was used directly as the transparent screen, the haze value was 0.3%, the diffusion transmittance was 0.3%, and the total light transmission was 90.0%. The transmitted frontal luminous intensity (×1000) and the reflected frontal luminous intensity measured with the goniophometer were both 0.0, thus both transmitted light and reflected light were poor. The viewing angle measured with the goniophometer was ±6 degrees, which was found to result in poor viewing angle property. The image clarity was 71%, and the image seen transmitted through the screen was clear; however, upon visually evaluating the visibility, the image was unable to be visualized both from the front and the back.

Comparative Example 3

A transparent light scattering layer (a sheet-form transparent molding) in a film thickness of 80 μm was made in the same manner as Comparative Example 1, except that the added amount of the $ZrO_2$ particles were 3.0% by mass in the Manufacturing Process of Pellet (1) of Example 1.

When the transparent light scattering layer (the sheet-form transparent molding) as made was used directly as the transparent screen, the haze value was 34.1%, the diffusion transmittance was 21.3%, and the total light transmission was 62.5%.

The transmitted frontal luminous intensity (×1000) measured with the goniophometer was 12.8, which was found to result in excellent transmitted frontal luminous intensity. The reflected frontal luminous intensity measured with the goniophometer was 0.8, which was found to result in excellent reflected frontal luminous intensity. The viewing angle measured with the goniophometer was ±8 degrees, which was found to result in excellent viewing angle property. The image clarity was 43%, and the image seen transmitted through the screen was clear. Upon visually evaluating the visibility, the image was unable to be visualized both from the front and the back.

The details of the transparent light scattering layers used in the Examples and the Comparative Examples are shown in Table 1.

TABLE 1

| | Transparent light scattering layer | | | | | | | |
|---|---|---|---|---|---|---|---|---|
| | Resin | | Flake-form microparticles | | | | | |
| | Type | Refractive index $n_1$[—] | Type | Brilliance | Average diameter [μm] | Aspect ratio | Regular reflectance [%] | Content [% by mass] |
| Example 1 | PET | 1.68 | Aluminum A | Yes | 10 | 300 | 62.8 | 0.0085 |
| Example 2 | PET | 1.68 | Aluminum A | Yes | 10 | 300 | 62.8 | 0.014 |
| Example 3 | PET | 1.68 | Aluminum A | Yes | 10 | 300 | 62.8 | 0.042 |
| Example 4 | PET | 1.68 | Aluminum B | Yes | 7 | 40 | 24.6 | 0.0085 |
| Example 5 | PET | 1.68 | Aluminum B | Yes | 7 | 40 | 24.6 | 0.014 |
| Example 6 | PET | 1.68 | Aluminum B | Yes | 7 | 40 | 24.6 | 0.04 |
| Example 7 | PET | 1.68 | $TiO_2$-coated mica | Yes | 12 | 80 | 16.5 | 0.1 |
| Example 8 | PET | 1.68 | Aluminum A | Yes | 10 | 300 | 62.8 | 0.0085 |
| Example 9 | PET | 1.68 | Aluminum C | Yes | 1 | 25 | 16.8 | 0.002 |
| Example 10 | PET | 1.68 | Aluminum C | Yes | 1 | 25 | 16.8 | 0.004 |
| Example 11 | PET | 1.68 | Aluminum C | Yes | 1 | 25 | 16.8 | 0.004 |
| Example 12 | PET | 1.68 | $TiO_2$-coated mica | Yes | 12 | 80 | 16.5 | 3 |
| Example 13 | PET | 1.68 | Aluminum A | Yes | 10 | 300 | 62.8 | 0.0085 |
| Example 14 | PET | 1.68 | Aluminum A | Yes | 10 | 300 | 62.8 | 0.0085 |
| Example 15 | PMMA | 1.49 | Silver | Yes | 1 | 200 | 32.8 | 0.85 |
| Example 16 | PC | 1.59 | Nickel | Yes | 9 | 90 | 16.8 | 0.25 |
| Example 17 | COP | 1.53 | Aluminum D | Yes | 15 | 750 | 68.9 | 0.05 |
| Example 18 | PET | 1.68 | $TiO_2$-coated mica | Yes | 12 | 80 | 16.5 | 0.01 |
| Example 19 | PET | 1.68 | Aluminum C | Yes | 1 | 25 | 16.8 | 0.0002 |
| Example 20 | PET | 1.68 | Aluminum E | Yes | 120 | 38 | 25.5 | 5.0 |
| Example 21 | PET | 1.68 | Aluminum C | Yes | 1 | 25 | 16.8 | 0.0001 |
| Example 22 | PET | 1.68 | Aluminum A | Yes | 10 | 300 | 62.8 | 0.0085 |
| Comparative Example 1 | PET | 1.68 | — | — | — | — | — | — |
| Comparative Example 2 | PET | 1.68 | Mica A-21S | No | 23 | 70 | 9.8 | 0.2 |
| Comparative Example 3 | PET | 1.68 | — | — | — | — | — | — |

| | Transparent light scattering layer | | | | Transparent reflection layer | | | Optical film thickness (refractive index × film thickness) [nm] |
|---|---|---|---|---|---|---|---|---|
| | Substantially spherical microparticles | | | | | | | |
| | Type | Refractive index $n_2$[—] | Content [% by mass] | Thickness [μm] | Type | Refractive index $n_3$[—] | Film thickness [nm] | |
| Example 1 | — | — | — | 80 | — | — | — | — |
| Example 2 | — | — | — | 100 | — | — | — | — |
| Example 3 | — | — | — | 80 | — | — | — | — |
| Example 4 | — | — | — | 100 | — | — | — | — |
| Example 5 | — | — | — | 100 | — | — | — | — |
| Example 6 | — | — | — | 100 | — | — | — | — |
| Example 7 | — | — | — | 100 | — | — | — | — |
| Example 8 | $ZrO_2$ | 2.40 | 0.15 | 80 | — | — | — | — |
| Example 9 | — | — | — | 80 | — | — | — | — |
| Example 10 | — | — | — | 80 | — | — | — | — |
| Example 11 | — | — | — | 100 | ZnS | 2.37 | 40 | 94.8 |

TABLE 1-continued

| | | | | | | | | |
|---|---|---|---|---|---|---|---|---|
| Example 12 | — | — | — | 100 | — | — | — | — |
| Example 13 | ZrO$_2$ | 2.40 | 0.001 | 80 | — | — | — | — |
| Example 14 | Acryl | 1.51 | 0.15 | 80 | — | — | — | — |
| Example 15 | — | — | — | 20 | — | — | — | — |
| Example 16 | — | — | — | 40 | — | — | — | — |
| Example 17 | — | — | — | 10 | — | — | — | — |
| Example 18 | BaTiO$_3$ | 2.40 | 0.01 | 500 | — | — | — | — |
| Example 19 | TiO$_2$ | 2.72 | 0.0002 | 1000 | — | — | — | — |
| Example 20 | — | — | — | 500 | — | — | — | — |
| Example 21 | — | — | — | 40 | — | — | — | — |
| Example 22 | ZrO$_2$ | 2.40 | 1.5 | 100 | — | — | — | — |
| Comparative Example 1 | ZrO$_2$ | 2.40 | 0.15 | 80 | — | — | — | — |
| Comparative Example 2 | — | — | — | 80 | — | — | — | — |
| Comparative Example 3 | ZrO$_2$ | 2.40 | 3.0 | 80 | — | | | |

Various physicalities and the results of performance evaluation of the sheet-form transparent moldings in the Examples and the Comparative Examples are shown in Table 2.

TABLE 2

| | Sheet-form transparent molding | | | | | | | Screen Performance | |
|---|---|---|---|---|---|---|---|---|---|
| | Haze [%] | Diffusion transmittance [%] | Total light transmittance [%] | Transmitted Frontal luminous intensity × 1000 | Reflected Frontal luminous intensity | Viewing angle | Image Clarity [%] | Observation from the back (Transmission type) | Observation from the front (Reflection type) |
| Example 1 | 4.3 | 3.7 | 86.0 | 1.02 | 8.9 | ±14 | 92 | ○ | ◉ |
| Example 2 | 5.8 | 5.1 | 87.4 | 1.64 | 14.4 | ±17 | 87 | ○ | ◉ |
| Example 3 | 17.1 | 12.1 | 71.0 | 3.51 | 32.0 | ±25 | 82 | ○ | ◉ |
| Example 4 | 4.1 | 3.6 | 87.4 | 0.85 | 5.7 | ±14 | 92 | ○ | ◉ |
| Example 5 | 6.4 | 5.5 | 85.9 | 1.55 | 7.2 | ±16 | 86 | ○ | ◉ |
| Example 6 | 9.4 | 7.3 | 77.9 | 1.94 | 19.9 | ±19 | 81 | ○ | ◉ |
| Example 7 | 2.1 | 1.9 | 89.0 | 0.46 | 4.9 | ±10 | 80 | ○ | ◉ |
| Example 8 | 11.6 | 10.0 | 86.8 | 13.04 | 3.1 | ±23 | 79 | ◉ | ◉ |
| Example 9 | 1.8 | 1.6 | 89.0 | 0.79 | 5.0 | ±14 | 83 | ○ | ◉ |
| Example 10 | 3.7 | 3.2 | 87.0 | 1.49 | 6.9 | ±20 | 84 | ○ | ◉ |
| Example 11 | 4.4 | 3.5 | 80.0 | 1.02 | 23.3 | ±22 | 75 | ○ | ◉ |
| Example 12 | 18.2 | 13.1 | 72.0 | 3.71 | 36.0 | ±29 | 71 | ○ | ◉ |
| Example 13 | 4.6 | 4.0 | 86.4 | 1.20 | 9.2 | ±15 | 88 | ◉ | ◉ |
| Example 14 | 13.1 | 11.1 | 85.0 | 11.20 | 2.8 | ±22 | 73 | ◉ | ◉ |
| Example 15 | 5.4 | 3.8 | 70.1 | 1.32 | 13.8 | ±15 | 75 | ○ | ◉ |
| Example 16 | 6.3 | 5.2 | 82.5 | 1.14 | 11.3 | ±18 | 71 | ○ | ◉ |
| Example 17 | 3.7 | 3.0 | 80.9 | 2.72 | 8.3 | ±22 | 71 | ○ | ◉ |
| Example 18 | 5.2 | 4.0 | 77.5 | 1.89 | 4.5 | ±24 | 79 | ◉ | ◉ |
| Example 19 | 6.6 | 4.7 | 71.5 | 2.13 | 8.2 | ±17 | 81 | ◉ | ◉ |
| Example 20 | 18.5 | 12.2 | 66.0 | 10.5 | 28.3 | ±32 | 80 | ○ | ◉ |
| Example 21 | 1.2 | 1.1 | 95.2 | 0.34 | 1.8 | ±12 | 89 | ○ | ○ |
| Example 22 | 15.6 | 12.1 | 77.3 | 11.3 | 2.1 | ±23 | 65 | ◉ | ◉ |
| Comparative Example 1 | 9.0 | 8.1 | 90.0 | 2.63 | 1.0 | ±20 | 78 | △ | X |
| Comparative Example 2 | 0.3 | 0.3 | 90.0 | 0.00 | 0.0 | ±6 | 71 | X | X |
| Comparative Example 3 | 34.1 | 21.3 | 62.5 | 12.8 | 0.8 | ±8 | 43 | X | X |

DESCRIPTION OF SYMBOLS

11 Transparent light scattering layer
12 Bright flake-form microparticle
13 Substantially spherical microparticle
14 Resin
15 Transparent reflection layer
21 Transparent sheet (transparent light scattering layer)
22 Transparent partition (support)
23 Transparent screen
24 Viewer
25A, 25B Projection device
26A, 26B Projected light
27A, 27B Scattered light

The invention claimed is:
1. A reflection type transparent screen comprising:
a sheet-form transparent molding;
a transparent light scattering layer; and
a resin and bright flake-form microparticles, wherein a content of the bright flake-form microparticles is from 0.0001 to 1.0% by mass based on the resin, an average diameter of primary particles of the bright flake-form microparticles is from 0.1 to 30 μm and an average aspect ratio of the bright flake-form microparticles is from 10 to 800, the bright flake-form microparticles are metallic particles selected from the group consisting of aluminum, silver, copper, platinum, gold, titanium, nickel, tin, indium and chromium, or a bright material of glass coated with those metals, a total light transmittance of the sheet-form transparent molding is 70% or higher, a haze value of the sheet-form transparent molding is from 1% to 15% or less, and an image clarity of the sheet-form transparent molding is 70% or higher.

2. The reflection type transparent screen according to claim 1, wherein
a regular reflectance of the bright flake-form microparticles is 12% or higher.

3. The reflection type transparent screen according to claim 1, wherein
the transparent light scattering layer further comprises substantially spherical microparticles.

4. The reflection type transparent screen according to claim 3, wherein
a difference between a refractive index $n_2$ of the substantially spherical microparticles and a refractive index $n_1$ of the resin satisfies the following formula (1):

$$|n_1 - n_2| \geq 0.1 \quad (1),$$

a median diameter of primary particles of the substantially spherical microparticles is from 0.1 to 500 nm,
the content of the substantially spherical microparticles is from 0.0001 to 2.0% by mass based on the resin.

5. The reflection type transparent screen according to claim 3, wherein
the substantially spherical microparticles are at least one selected from the group consisting of zirconium oxide, zinc oxide, titanium oxide, cerium oxide, barium titanate, strontium titanate, magnesium oxide, calcium carbonate, barium sulfate, diamond, a cross-linked acrylic resin, a cross-linked styrene resin, and silica.

6. The reflection type transparent screen according to claim 1, further comprising a transparent reflection layer having a refractive index $n_3$, larger than a refractive index $n_1$ of the resin, on one face of the reflection type transparent screen.

7. The reflection type transparent screen according to claim 6, wherein
the refractive index $n_3$ of the transparent reflection layer is 1.8 or higher,
an optical film thickness represented by the product of the refractive index $n_3$ and film thickness d of the transparent reflection layer is from 20 to 400 nm.

8. The reflection type transparent screen according to claim 1, wherein
the transparent reflection layer comprises at least one selected from the group consisting of titanium oxide, niobium oxide, cerium oxide, zirconium oxide, indium tin oxide, zinc oxide, tantalum oxide, zinc sulfide, and tin oxide.

9. A laminated body comprising the reflection type transparent screen according to claim 1.

10. A member for a vehicle, comprising the reflection type transparent screen according to claim 1.

11. A member for a house, comprising the reflection type transparent screen according to claim 1.

12. An image projection device, comprising the reflection type transparent screen according to claim 1, and a projection device.

* * * * *